United States Patent
Tugnawat et al.

(10) Patent No.: US 8,756,256 B2
(45) Date of Patent: Jun. 17, 2014

(54) METHOD AND SYSTEMS FOR THE MANAGEMENT OF NON VOLATILE ITEMS AND PROVISIONING FILES FOR A COMMUNICATION DEVICE WITH MULTIPLE SERVICE ACCOUNTS

(75) Inventors: Yogesh Tugnawat, San Diego, CA (US); Samir B. Thakkar, San Diego, CA (US); Billy A. Oostra, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 12/787,955

(22) Filed: May 26, 2010

(65) Prior Publication Data
US 2011/0296399 A1  Dec. 1, 2011

(51) Int. Cl.
| | |
|---|---|
| G06F 7/00 | (2006.01) |
| G06F 17/30 | (2006.01) |
| G06F 9/445 | (2006.01) |
| H04M 1/66 | (2006.01) |
| H04M 1/68 | (2006.01) |
| H04M 3/16 | (2006.01) |
| H04M 3/00 | (2006.01) |
| H04W 4/00 | (2009.01) |

(52) U.S. Cl.
USPC ........ 707/805; 455/411; 455/418; 455/432.1; 717/175

(58) Field of Classification Search
None
See application file for complete search history.

(56) References Cited

U.S. PATENT DOCUMENTS

| | | | |
|---|---|---|---|
| 5,734,487 A | 3/1998 | Rossi | |
| 5,887,254 A | 3/1999 | Halonen | |
| 6,829,222 B2 | 12/2004 | Amis et al. | |
| 6,876,295 B1 | 4/2005 | Lewis | |
| 6,975,632 B2 | 12/2005 | Deo et al. | |
| 6,978,453 B2 * | 12/2005 | Rao et al. | 717/171 |
| 7,200,390 B1 * | 4/2007 | Henager et al. | 455/419 |
| 7,305,090 B1 | 12/2007 | Hayes et al. | |
| 7,461,374 B1 | 12/2008 | Balint et al. | |
| 7,516,206 B2 | 4/2009 | Henseler et al. | |
| 7,565,650 B2 | 7/2009 | Bhogal | |
| 7,769,371 B1 | 8/2010 | Lamb et al. | |
| 8,150,425 B1 | 4/2012 | Soelberg et al. | |
| 2002/0116632 A1 | 8/2002 | Itoh et al. | |
| 2004/0018853 A1 | 1/2004 | Lewis | |
| 2004/0031030 A1 | 2/2004 | Kidder et al. | |

(Continued)

FOREIGN PATENT DOCUMENTS

| | | |
|---|---|---|
| CN | 1481078 A | 3/2004 |
| CN | 201004628 Y | 1/2008 |

(Continued)

OTHER PUBLICATIONS

International Search Report and Written Opinion—PCT/US2011/037542, International Search Authority—European Patent Office—Aug. 25, 2011.

*Primary Examiner* — Michael Hicks
(74) *Attorney, Agent, or Firm* — Michael F. Taveira

(57) ABSTRACT

Methods and systems enable communication devices equipped with software defined radio based chipset modules to seamlessly re-program the communication device to operate on any of a variety of service provider networks. By re-programming a communication device equipped with software defined radio based chipset module, the communication device can support communications over both UMTS and CDMA communication networks. An environment is provided which allows a user to quickly and efficiently switch between service provider accounts supporting communications.

28 Claims, 9 Drawing Sheets

(56) References Cited

U.S. PATENT DOCUMENTS

| | | |
|---|---|---|
| 2004/0152488 A1 | 8/2004 | Nakagomi |
| 2004/0176080 A1 | 9/2004 | Chakravorty et al. |
| 2004/0230965 A1 | 11/2004 | Okkonen |
| 2004/0237081 A1 | 11/2004 | Homiller |
| 2005/0010916 A1 | 1/2005 | Hagen et al. |
| 2005/0054336 A1 | 3/2005 | Sanding |
| 2005/0055689 A1 | 3/2005 | Abfalter et al. |
| 2006/0203722 A1 | 9/2006 | Oommen |
| 2006/0221918 A1 | 10/2006 | Wang |
| 2006/0277539 A1 | 12/2006 | Amarasinghe et al. |
| 2007/0129078 A1 | 6/2007 | De Beer |
| 2007/0190994 A1 | 8/2007 | Sakai et al. |
| 2008/0177994 A1 | 7/2008 | Mayer |
| 2008/0266595 A1 | 10/2008 | Wright et al. |
| 2009/0075698 A1 | 3/2009 | Ding et al. |
| 2009/0100420 A1 | 4/2009 | Sapuntzakis et al. |
| 2009/0196268 A1 | 8/2009 | Caldwell et al. |
| 2009/0215449 A1 | 8/2009 | Avner |
| 2010/0179991 A1 | 7/2010 | Lorch et al. |
| 2010/0182163 A1 | 7/2010 | Rennie et al. |
| 2010/0274930 A1* | 10/2010 | Thakkar et al. .................... 710/8 |
| 2010/0291898 A1* | 11/2010 | Sanding et al. ............... 455/411 |
| 2010/0291910 A1* | 11/2010 | Sanding et al. ............... 455/418 |
| 2011/0010543 A1 | 1/2011 | Schmidt et al. |
| 2011/0035741 A1* | 2/2011 | Thiyagarajan ................ 717/170 |
| 2011/0191572 A1 | 8/2011 | Taylor et al. |
| 2011/0191844 A1 | 8/2011 | Bogineni et al. |

FOREIGN PATENT DOCUMENTS

| | | |
|---|---|---|
| CN | 101171858 A | 4/2008 |
| DE | 19543843 A1 | 5/1997 |
| EP | 1085395 A2 | 3/2001 |
| EP | 1473845 A1 | 11/2004 |
| EP | 1551107 | 7/2005 |
| EP | 1761088 A1 | 3/2007 |
| GB | 2292047 A | 2/1996 |
| JP | 5336035 A | 12/1993 |
| JP | 11205406 A | 7/1999 |
| JP | 2000324043 A | 11/2000 |
| JP | 2002251326 A | 9/2002 |
| JP | 2006119992 A | 5/2006 |
| JP | 2006270910 A | 10/2006 |
| JP | 2006309533 A | 11/2006 |
| JP | 2006331307 A | 12/2006 |
| JP | 2007221449 A | 8/2007 |
| JP | 2008236342 A | 10/2008 |
| WO | 9317512 A1 | 9/1993 |

* cited by examiner

| Category | Definition | Example |
|---|---|---|
| Factory Default | NV items which are part of RF Cal or QCN | Band Preference, 441 |
| Factory Provisioning | Carrier Specific Files, NV item specific to NOEM | 10.key, ERI, VID/PID etc |
| Multiplexed/ Factory Provisioning | Multiplexed NV items initialized in Factory per MEID | Akey, SPC and OTKSL |
| Multiplexed/ Software | NV items Initialized and Multiplexed by Software | MIP Username, Password etc |
| UQCN | Static Carrier Specific Items get overwritten when loading a new build with values specified in UQCN | SCI, MIP Retries etc |
| Multiplexed/UQCN | Multiplexed Dynamic/Static Carrier Specific Items get overwritten when loading a new build with values specified in UQCN. This is further-re categorized inside UQCN as Read Write or WriteOnce | SD timers (RW), PRL (WO) |
| Software | NV Items which are set by Software and does not change after activation | Model Name, FW Rev etc |

Fig. 4

METHOD AND SYSTEMS FOR THE MANAGEMENT OF NON VOLATILE ITEMS AND PROVISIONING FILES FOR A COMMUNICATION DEVICE WITH MULTIPLE SERVICE ACCOUNTS

RELATED APPLICATIONS

The present application is related to U.S. patent application Ser. No. 12/467,281 entitled "Method and Apparatus for Programming a Communication device with Multiple Service Accounts," filed May 17, 2009, U.S. patent application Ser. No. 12/467,282 entitled "Method and Apparatus for Tracking the Programming of a Communication device with Multiple Service Accounts," filed May 17, 2009, and U.S. patent application Ser. No. 12/431,050 entitled "Method for Generically Handling Carrier Specific Provisioning for Computer Cellular Wireless Cards," filed Apr. 28, 2009, the entire contents of each are hereby incorporated by reference.

FIELD OF THE INVENTION

The present invention relates generally to provisioning and programming a cellular communication devices, and more particularly to methods and apparatus for provisioning and programming multiple service provider accounts on a single cellular communication device/unit across multiple technologies and/or multiple carriers.

BACKGROUND

Traditionally, cellular communication devices are designed and programmed to operate on a specific carrier's network using a specific technology. Often times, carriers attempt to lure more potential customers to their specific carrier network service by offering unique services, features, and communication devices. However, this often frustrates users by forcing a user to only use specific devices designed and programmed to be used with the specific carrier's network.

In order to provide users with the flexibility of a communication device capable of operating with any carrier network, communication devices may be equipped with software defined radio based chipset modules, such as Qualcomm's Gobi® chipset. These software defined radio based chipset modules allow a communication device to generate, encode/decode and modulate/demodulate data signals within a programmable digital signal processor (DSP). The programmable DSP enables the communication signal to be defined by software to conform with the wave form, frequency and data packet requirements of any communication technology (i.e., GSM/UMTS v. CDMA). By re-programming the DSP to generate signals with different characteristics, the communication device may be made to generate a communication signal that is compatible with any carrier's unique communications network, regardless of communication technology being utilized by a specific carrier. Thus, a communication device equipped with such a software defined radio based chipset module may subscribe to any carrier for communications support.

While communication devices equipped with such software defined radio based chipset modules are capable of being programmed to operate on virtually every carrier's communication network, in order to operate properly on a carrier's communication network the communication device must also be properly provisioned for the selected carrier's network. Each carrier requires the implementation of a large number of unique parameter values that not only vary from carrier to carrier, but may even vary among accounts supported by the same carrier. This implementation is referred to as the provisioning of the communication device. Given the wide variety of communication device operation, available feature sets offered by different carriers, and large number of possible provisioning parameters, the efficient programming and provisioning of such communication devices is difficult to achieve.

SUMMARY

Various embodiment methods and systems are provided to categorize and store non-volatile provisioning data parameters for multiple carriers so that an appropriately equipped communication device can operate on any of a number of different carrier communication networks. Such a communication device may include a software based radio chipset module enabling it to communicate with cellular networks of all technology types (including UMTS, CDMA, and GPS).

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 4 is a chart identifying various categories of nonvolatile (NV) items that are used in various carrier provisioning images.

DETAILED DESCRIPTION

Figure 1:
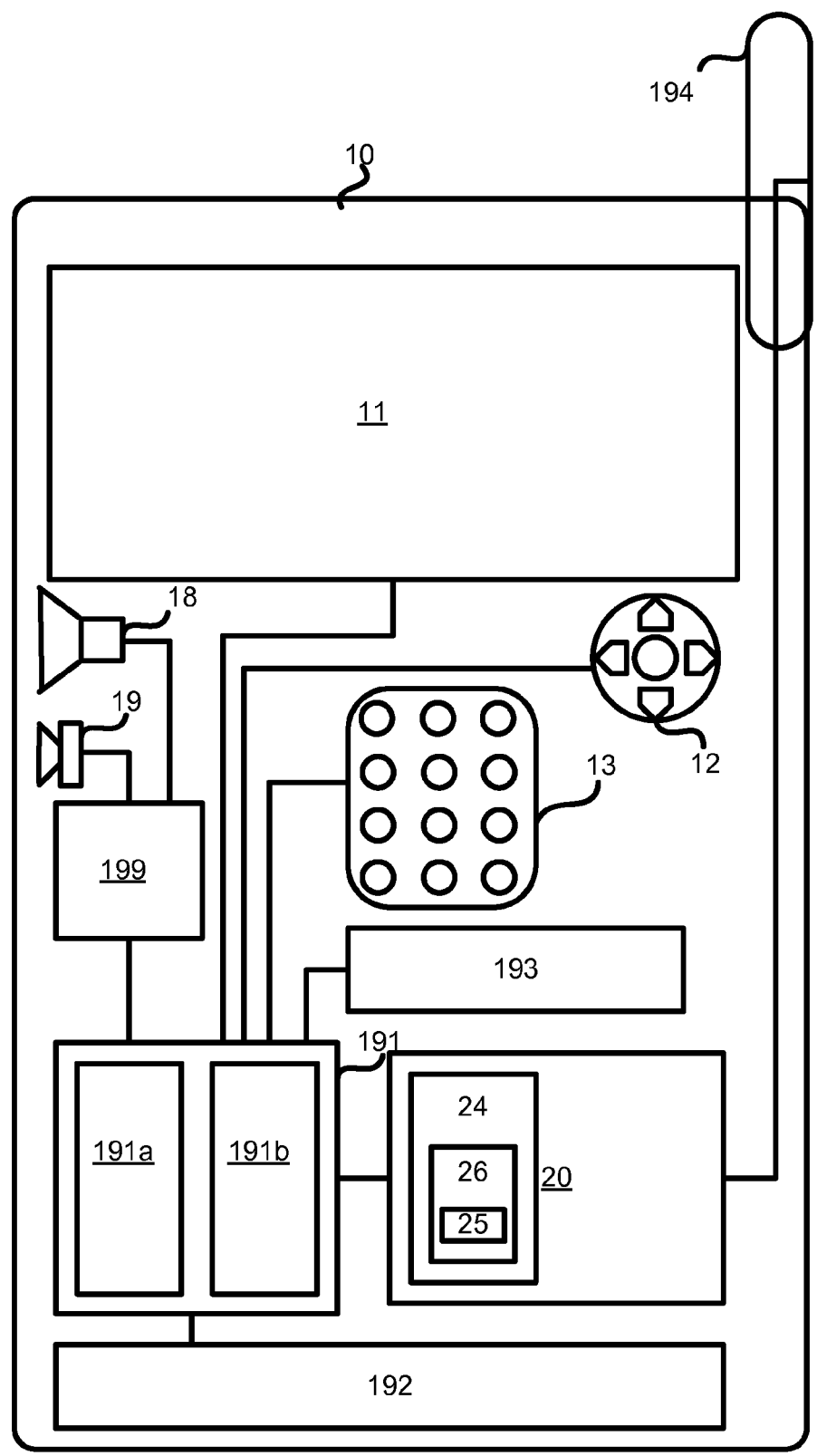
FIG. 1 is a block diagram depicting typical components of a communication device capable of supporting the various embodiments.

The present systems, devices, apparatus, methods, and machine-readable medium will be described in more detail hereinafter with reference to the accompanying drawings, in which aspects of the inventions are shown. The systems, devices, apparatus, methods, and machine-readable medium, however, may be embodied in many different forms and should not be construed as limited to the aspects set forth herein; rather, the present aspects are provided so that the subject disclosure will be thorough and complete, and will convey the scope of the invention to those skilled in the art. Like numbers refer to like elements throughout.

In this description, the term "exemplary" is used herein to mean "serving as an example, instance, or illustration." Any implementation described herein as "exemplary" is not necessarily to be construed as preferred or advantageous over other implementations.

As used herein, the term "communication device" is intended to encompass any form of programmable computer as may exist or will be developed in the future which implements a communication module for wireless voice and data communications, including, for example, cellular telephones, personal data assistants (PDA's), palm-top computers, laptop and notebook computers, wireless electronic mail receivers (e.g., the Blackberry® and Treo® devices), multimedia Internet enabled cellular telephones (e.g., the Blackberry Storm®), and similar personal electronic devices which include a wireless communication module, processor and memory. In a preferred embodiment, the communication device is a portable computer with a software defined radio based chipset module.

Typically, individual operators of cellular communication networks, often referred to as carriers, have made significant investments in their networks and compete with one another in the marketplace on the basis of service and feature sets. As a result, the carriers have economic reasons for limiting access to their networks. Accordingly, carriers often seek to control who is given access to their communication networks. One conventional way in which carriers control access to their communication networks is by limiting which communication devices are given access to the carrier's communication device.

Conventional cellular communication devices employ one of two competing technologies. Communication devices designed to operate on one of the competing technologies do not operate on the other, and vice versa. One of these network technologies is Universal Mobile Telecommunications Systems (UMTS). UMTS a third generation (3G) technology designed to succeed the Global System for Mobile Communications (GSM) technology. UMTS is sometimes referred to as a 3GSM. The second network technology is Code Division Multiple Access (CDMA). While there are a number of differences between the two competing technologies, at the core UMTS implements a time-division multiplexing scheme, while CDMA (as its name implies) implements a code-based multiplexing scheme. In a UMTS network a portion of the network's total bandwidth is allocated as a channel to a communication device. The network base station then selectively "listens" to each of the allocated channels for a short amount of time to send and receive voice and/or data information to and from the communication device. The base station can only selectively listen to the allocated channel for a short amount of time because it must also listen to other channels allocated to other communication devices operating on the network. While effective, the UMTS scheme is hampered by its limited bandwidth and need to dedicate a single channel to a single communication device.

In contrast, in a CDMA network, each channel may be utilized by multiple communication devices. In order to differentiate the information received from different communication devices operating on the same allocated channel, each communication device is assigned a different coding offset in which to encode its voice and/or data information. By selectively switching the decoding code offset, the base station can decode the information received from multiple communication devices operating on the same allocated channel. This greatly increases the capacity to service more communication devices on the same amount of total bandwidth.

In addition to the multiplexing and encoding schemes implemented on each of the competing technologies, individual service providers operating competing communication networks may modify other aspects of the communication signals being sent and received over their respective communication networks. This allows each carrier to differentiate their network from another and in some instances offer differentiating features to its customers. These aspects may include communication signal waveforms, frequency, amplitude, etc.

In order to properly operate on a particular carrier's network, a communication device must be equipped with the necessary hardware to generate the appropriate waveform with the correct modulation, and coding scheme as required by the service provider's network. Because of the fundamental differences in the type of waveform, modulation and coding schemes used between the two competing networks, communication devices equipped with the necessary hardware to operate on a UMTS technology network cannot operate on a CDMA technology network, and vice versa.

A second conventional way in which carriers control access to their communication networks is by creating a unique provisioning information image that can only be received directly from the carrier. Without the appropriate provisioning image loaded into the communication device's non-volatile memory, the communication device may not access the carrier's communication network. By generating a provisioning image that is unique to the carrier, the carrier may restrict communication devices operating with the same communications technology (i.e., UMTS vs. CDMA) from accessing the carrier's network to only those communication devices employing the appropriate communications technology and the appropriate provisioning image.

The provisioning information that needs to be loaded onto a cellular communication device includes information needed by the communication device to access the network, identifiers to be transmitted by the communication device to the network, and information to enable the communication device to connect to cellular networks no matter where they are located. In particular, the communication device needs to be informed of the frequencies and access codes for connecting to a particular carrier's network. Also, the communication device needs to be programmed with identification codes that it will transmit to the carrier's network so that the carrier will recognize the communication device as authorized to access the network. The provisioning information will also include data known as the Preferred Roaming List (PRL), which is a set of carriers and network access frequencies to be used when the primary network is unavailable. In addition to such subscription related data, the provisioning information may also include feature flags and definitions that activate features and applications on the communication device by setting particular variables to specific values. For example, one carrier may choose to support a particular optional feature in the 3G standard, and does so by setting associated flags and data values in the provisioning. A second carrier that chooses not to support that optional feature commercial reasons would include in its provisioning data a different set of flags and data associated with this feature.

Provisioning information is typically stored in nonvolatile (NV) memory, such as flash memory, on the transceiver circuit board. This ensures that the essential provisioning information is always available to the communication device for connecting to the network. As such, the provisioning information is said to contain a variety of NV items. Each NV item may contain a value or array of data. Each NV item may be utilized by the carrier to perform a function or feature set.

Currently, several thousand possible NV items exist. Conventionally, communication device manufacturers developed a particular device model for a particular carrier. Because particular device models are designed and developed for particular carriers, the manufacturers of the communication devices may set various NV items and NV item values in the flash memory so that the communication device and each of its functions and applications works properly on the particular carrier's communication network. In order to allow the communication device to initiate communication on multiple carriers, the NV items and NV item values may need to be altered each time a new carrier is selected. Various embodiments disclosed herein allow for the modification and revision of the NV items and NV item values stored in a communication device containing a software defined communication module.

In order to sustain communication on a particular carrier's communication network, certain requirements must be satisfied by the communication device. In order to satisfy these requirements, the software being executed by the communication device implements various NV items and NV item values. Thus, a different provisioning/notation file image may exist for each device operating on each possible carrier network. The provisioning/notation file image may be certified by each carrier to insure that each communication device executing the provisioning image does not damage the carrier's communication network or impact other the communication links or other communication devices established on the carrier's network. Each provisioning image may vary not only the values assigned to each NV item, but also by which NV items are contained in the carrier specific provisioning image. A carrier specific provisioning image need not contain a value for all of the possible NV items. Indeed, many of the NV items are not contained within a carrier's provisioning image as many of the NV items are related to various feature sets that are not necessarily offered by all carriers. For example, some of the NV items are related to Global Positioning System (GPS) applications. If the carrier is not offering GPS applications in its feature sets, then the provisioning image for that carrier may not contain any reference to those NV items. Carriers may also distinguish their provisioning images from those of another carrier by varying the format of the value assigned to a particular NV item.

For the NV items that are common to most provisioning images, each carrier provisioning image has a different value or format to the value for a particular common NV item. These values are stored in the communication device's non-volatile memory for access by various software function calls. When a software build for a particular carrier attempts to execute a function on the communication device, the software build may attempt to access specific NV item values. In order for the software to execute properly, the value for a particular NV item must not only be stored in the correct NV memory location, but it must also have the correct format and value. Otherwise the software executing on the communication device will not be able to execute the function properly. For example, if the correct channel frequencies are not stored in the appropriate NV memory location with the correct values for a selected carrier, when the software executing on a communication device attempts to initiate a call over the carrier's communication network the correct channel frequencies will not be accessed and the call will fail.

Moreover, some NV item values are not only unique to the carrier, but further unique to a particular user's subscription account with the carrier. Some NV item values are assigned to the user's subscription account when the user initiates the provisioning process. For example, the phone number, user names, passwords, etc. may be unique not only to a carrier's provisioning image but further unique to each individual user's subscription account. Thus, the provisioning image for one subscription account may be different from the provisioning image for a different subscription account despite the fact that both subscription accounts are being supported by the same carrier using the same communication technology (i.e., UMTS, CDMA).

In some settings, a removable smart card such as a Subscriber Identity Module (SIM) card or analogous R-UIM card may allow a user to interchange the provisioning data loaded into a communication device without the need for carrier intervention. The provisioning information for different carriers may be stored on the removable smart card. Because each smart card may store the provisioning data for a different carrier, a user may physically interchange smart cards in a communication device to use different carrier networks for primary service. However, the need to physically interchange smart cards requires a user to carry multiple smart cards. In addition, the physical interchange of smart cards is cumbersome. Lastly, the use of smart cards still does not allow a communication device equipped with the necessary hardware to operate on a UMTS technology network to operate on a CDMA technology network and vice versa.

As discussed above, conventional communication devices have been equipped and designed with a hardware defined radio chipset module. As a result, conventional communication devices are designed to operate on a single communication technology (e.g., GSM/UMTS v. CDMA). While such conventional communication devices assist carriers to restrict access to their communication networks, such device design often frustrates users by preventing users to use their communication device with any carrier. For example, a user who owns a CDMA type communication device may not be able to use the communication device in an area where only UMTS carrier networks operate, and vice versa.

Additionally, conventional communication devices have been designed to operate with a single carrier's communication network. As a result, the non-volatile memory of the conventional communication devices may only store the provisioning image for a single carrier. If a user attempts to re-provision the communication device for another carrier (assuming the same communication technology i.e., UMTS vs. CDMA), the provisioning image for the first carrier is overwritten by the provisioning image for the second carrier. The provisioning image for the first carrier including any NV item values unique to the user's subscription account are lost. As a result, if the user attempts to re-provision the communication device with the provisioning image for the first carrier, NV items unique to the user's subscription account may be lost. As a result, the user may be assigned a new phone number or be required to re-enter a user name, password, etc. Essentially, the user is provided with a wholly new subscription account each time the user attempts to re-provision the communication device.

In order to overcome some of these difficulties and to provide user with the flexibility to use their communication device with virtually any carrier in existence, new communication devices may be equipped with software defined radio based chipset modules, such as Qualcomm's Gobi®. Such software defined radio based chipset modules, generate, encode/decode and modulate/demodulate data signals within a programmable digital signal processor (DSP). The programmable DSP enables the communication signal to be defined by software to conform with the wave form, frequency and data packet requirements of any communication technology (i.e., GSM/UMTS v. CDMA). By re-programming the DSP to generate signals with different characteristics, the communication device may be made to generate a communication signal that is compatible with any service provider's unique communications network. Thus, a communication device equipped with a software defined radio based chipset module may subscribe to any carrier for communications support regardless of communication technology required.

However, in order to operate properly on any carrier, even communication devices equipped with properly programmed software defined radio based chipset modules must also be properly provisioned for the selected carrier. Previous attempts to re-program and re-provision the communication devices equipped with software defined radio based chipset modules required a complete replacement of the entire software build as well as the provisioning image. This re-programming and re-provisioning may be considered time consuming and inefficient. In addition, updates to minor portions of the software build would require a complete re-programming of the updated software build.

The various apparatus and methods disclosed herein are directed to the efficient programming and provisioning of communication devices equipped with such software defined radio based chipset modules. Various embodiment apparatus and methods utilize a notation file to modify/update the software build and provisioning image. By categorizing the set of possible NV items contained in a carrier's provisioning information, the values for NV items required by a carrier's software build and provisioning image may be efficiently packaged in a small binary format file. Updates to the notation file may effectuate updates to the software build by directing the software build to implement different NV items and/or NV item values. Because the size of the notation file is significantly smaller than a complete software build, updates to the software build may be made and transmitted to the communication device with great speed and efficiency. The notation file may contain NV item values themselves or indices to memory locations and slots where the value of various NV items have been previously stored in memory. In most cases, the notation file is specific to each carrier supporting communications. However, in some instances the notation file may be shared or common to multiple carriers. This may be the case where different carriers operate similar networks having similar provisioning requirements. (i.e., similar technology, features, applications, etc.). Thus, a generic notation file may be implemented for multiple carriers. By extracting and parsing the information contained in the generic notation file (along with the corresponding software build) a communication device 10 may be configured to operate on any of the multiple carrier networks. This may allow a user to seamlessly continue communications in areas where one of the multiple carrier's network coverage is not as good as another one of the multiple carrier's network.

FIG. 1 depicts typical components of a communication device 10 capable of supporting the various embodiments. A communication device 10 includes a processor 191 or dual (or more) processors 191a and 191b coupled to internal memory 192 and a user interface display 11. The communication device may also include a storage unit 193, such as a hard drive, which is capable of storing large volumes of data. The communication device 10 may also include a software-defined communication module 20 which is capable of operating on any of a plurality of service provider communication networks. The software-defined communication module 20 may include a flash memory 24 and file systems 26 which may store an indexed table of NV items for use in modifying the software operation of the device for a selected service provider. The flash memory 24 may contain a boot information block 25 and an embedded flash file system 26. The flash file system 26 may contain a number of files used to maintain NV items for service provider accounts not currently in use. One of the components of the embedded file system 26 may be NV items, discussed in more detail below. The communication device may further contain an internal memory 192 which provides storage for system memory items. Internal memory 192 may be SDRAM type memory.

The communication device 10 may include an antenna 194 for sending and receiving electromagnetic radiation that is connected to the software-defined communication module 20 coupled to the processor 191. Further, the communication device 10 includes a speaker 18 to produce audible sound and a microphone 19 for sensing sound, such as receiving the speech of a user. Both the microphone 19 and speaker 18 may be connected to the processor 191 via a vocoder 199 which transforms analog electrical signals received from the microphone 19 into digital codes, and transforms digital codes received from the processor 191 into analog electrical signals which the speaker 18 can transform into sound waves. In some implementations, the vocoder 199 may be included as part of the circuitry and programming of the processor 191. Communication devices also typically include a key pad 13 and menu selection buttons or rocker switches 12 for receiving user inputs.

The processor 191 may be any programmable microprocessor, microcomputer or multiple processor chip or chips that can be configured by software instructions (applications) to perform a variety of functions, including the functions of the various embodiments described below. In some communication devices, multiple processors 191 may be provided, such as one processor dedicated to wireless communication functions and one processor dedicated to running other applications. In some communication devices 10, multiple processors 191a, 191b may be provided to share wireless communication functions and/or application between them. Typically, software applications may be stored in the internal memory 192 before they are accessed and loaded into the processor 191. In some communication devices, the processor 191 may include internal memory sufficient to store the application software instructions. In some communication devices the processor 191 is included within the software-defined communication module 20, such as in Qualcomm's Gobi® which includes two processors in addition to signal generator and modem circuits.

Figure 2:
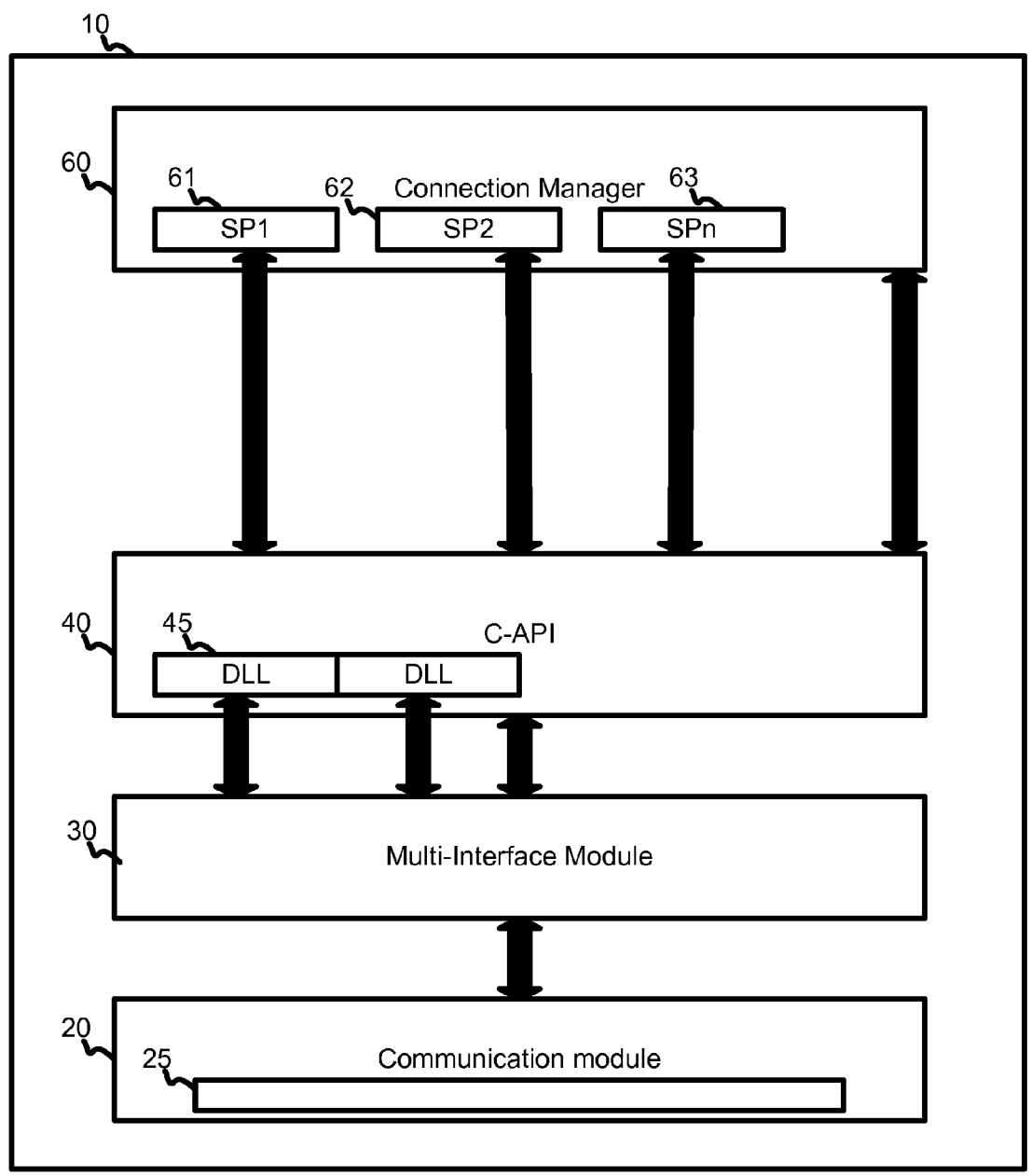
FIG. 2 is a hardware/software architecture diagram of software modules operating within a communication device equipped with a software defined radio based chipset module.

FIG. 2 is a hardware/software architecture diagram of software modules on a communication device equipped with a software defined radio based chipset modules. As shown in FIG. 2, the communication device 10 includes a software defined radio based chipset communication module 20 (communication module), such as Qualcomm's Gobi®. Software modules and dynamic link libraries (DLLs) may be loaded onto the hard drive or memory storage units of the communication device 10 by the manufacturer. In some instances, the communication device 10 may be pre-loaded with specific software modules for specific carriers. In other instances, the communication device 10 may be pre-loaded with generic software modules that may be utilized by the software builds for most if not all carriers. In other embodiments, each time a user activates a new account with a new carrier, software modules and DLLs may be loaded into the communication device's memory along with dynamic provisioning NV items.

In order to re-program the DSP within the software defined radio based chipset to generate a data signal compatible with a selected carrier network, the communication device 10 must load an appropriate software build for the selected carrier.

Each carrier's software build may contain the necessary instructions to generate, encode and modulate data signals to be properly carried over the service provider's communication network, as well as contain the necessary programming to carry out all of the additional features offered by the service provider. By selectively enabling the appropriate software build for different carriers, a communication device may be able to switch back and forth between multiple accounts supported by one or more carriers.

In previous attempts to re-program a software defined radio based chipset communication module 20, the entire software build was written into the memory buffers of the device 10 and the provisioning image was written into the flash memory 24. Recent enhancements allow the communication device to execute a much smaller notation file. The notation file provides direction to the processor to configure various software modules to generate a complete software build for a particular carrier. Because the notation file is significantly smaller in size than the software build, the notation file is much easier to update. In an embodiment, an additional binary format notation file (e.g., (UNDP Qualcomm Compact Notation, also referred to as UQCN) that encodes the NV items, PRL and any non-volatile settings specific to the selected carrier is provided. The additional notation file may be loaded along with the carrier specific software image as a separate file or bundled within the carrier specific software image. The notation file instructs the software build where various NV item values for different carriers may be retrieved from as well as where copies of received NV item values may be stored.

Each time a user elects to enable a different carrier account, the user may launch an individual connection manager for the selected carrier (61, 62, 63) or through a common connection manager 60. Each carrier's connection manager may contain a notation file (e.g., Universal Qualcomm Notation file (UQCN)) which instructs a common application programming interface (C-API) 40 to retrieve the appropriate DLLs and software modules within the multi interface module 30 to generate an accurate software build image for the selected carrier and retrieve selected NV item values from memory and place them into flash memory 24 of communication module 20. While the entirety of a software build may include a large number of software modules and DLLs, the notation file may be a small discrete file that may be easily updated. Updates to the notation file may allow carriers to modify their software builds quickly and easily by instructing the C-API 40 and multi-interface module 30 to retrieve different pre-stored software modules or NV item values. In contrast, conventional software builds may only be updated by loading wholly new software modules and DLLs. Typically, a notation file may be on the order of 10 kb, which is significantly smaller than the storage size of a software build. Thus, by transmitting the much smaller notation file, carriers may be able to make changes to the software build and provisioning image quickly and efficiently.

Figure 3:
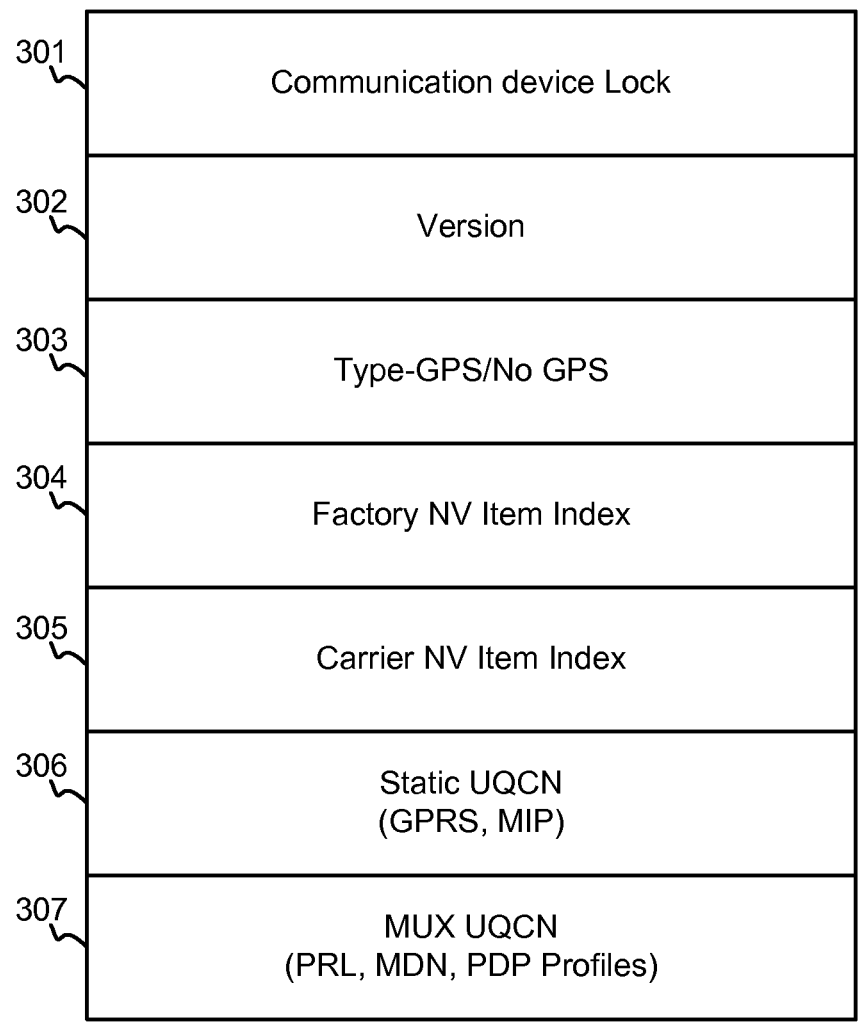
FIG. 3 is a block diagram of the various categories of information contained within a notation file.

FIG. 3 illustrates some of the various information blocks contained within a notation file that may be used to generate an accurate software build and provisioning image in a communication device 10. For example, the notation file may contain communication device lock data 301. The communication device lock data 301 may be used to restrict the communication device 10 to specific carrier accounts, described in more detail below. The notation file may also contain version number data 302, which allow the communication device 10 processor to verify that the communication device 10 has the most recent and updated version of the notation file, and thus the most recent and updated software build and provisioning image.

The notation file may also contain data that enables carrier specific features. For example, the notation file may contain NV item values that enable a GPS feature 303 for a particular carrier. Alternate version of the notation file may be loaded onto the communication device 10 with alternative NV item values which disables the GPS feature functionality of the communication device 10. In this manner, a carrier may be able to selectively enable and disable various features according to subscription level by transmitting a new notation file to identified communication devices. Similarly, the notation file may contain data related to NV items that are pre-stored in the communication device's memory by the factory that manufacturers the communication device 10.

As discussed in more detail below, when the communication device 10 is manufactured, the manufacturer may pre-load a number of NV item values into memory. Each of these NV items is stored in a specifically assigned memory slot. The factory NV item index 304 may contain the necessary information for the communication module 20 to retrieve the NV items related to a specific carrier when an account for the specific carrier is selected to be enabled. Similarly, each time a user activates a new account with a specific carrier various NV item values may be downloaded from the notation file specific to carrier and stored in memory. A copy of these NV item values may be generated and stored in the specifically assigned memory slots for subsequent retrieval. The carrier NV item index may contain a record of the specifically assigned memory slots containing these NV item values.

In contrast to the factory NV item index, the copy of the NV item values may not be actually generated and stored in a memory slot until the user elects to activate an account with a selected carrier. However, once the account has been activated, the copy of the specific carrier NV item values may be generated and stored in pre-assigned memory slots. The index of pre-assigned memory slots may be contained within the carrier NV item index 305.

Other information may be contained in the notation file that is specific to a particular carrier and does not change until a wholly new software build is loaded. Such static UQCN data 306 may include for example, SCI, MIP, retries, etc. Additionally, the notation file may include multiplexed UQCN data 307. Such multiplexed UQCN data may include, for example, preferred roaming lists (PRL), the mobile directory number (MDN) that is associated with the enabled carrier account, packet data protocols (PDP) profiles, etc.

Each of the foregoing items are specific to the carrier account currently enabled and may be overwritten in non-volatile memory when a new carrier account is enabled.

As discussed above, when a user desires to activate a different carrier account, not only must the appropriate software build be loaded, but the appropriate NV item profile values must also be loaded into the flash memory 24 of the communication module 20. Due to the large number of possible NV items appearing in a profile, management of all NV items can become difficult. Accordingly, an embodiment categorizes all possible NV items into a single document solution in order to manage, track, and distribute NV item settings and Factory Provisioning files for all possible service providers.

FIG. 4 is an exemplary data table which identifies the major categories of NV items as well as examples of NV items belonging to the identified category. The major categories identified in FIG. 4 are: Factory Default; Factory Provisioning; Multiplexed/Factory Provisioning; Multiplexed Software; UQCN; Multiplexed UQCN; and Software.

The Factory Default category of NV items may include NV items which are programmed by the factory at the time the communication device 10 is manufactured. For example, this category of NV items may include parameters that are used with the communication device's radio frequency (RF) calibration procedure. These NV items may include, for example, the band preference used by the communication device. The values of these NV items typically do not change regardless of which service provider account is currently enabled on the communication device. Also, the values of these NV items typically do not change regardless of communication technology used by the service provider account currently enabled on the communication device.

The second category of NV items is identified as Factory provisioning items. Similar to the factory default items, these items have their values assigned by the factory as the communication device 10 is manufactured. The Factory Provisioning category of NV items are specified by individual carriers. For example, individual service providers may wish to include a specific 10.key file, an Enhanced Roaming Indicator (ERI) file, a Vendor Identification/Product Identification (VID/PID) or Notebook lock. Many of the NV items in this category are unique to each individual carriers or OEM and may have unique carrier/OEM specific values. In many cases other carriers or OEM will not include the same NV items in their unique profiles.

The third category of NV items may include multiplexed factory provisioned items. Similar to the factory provisioning category of NV items, the multiplexed factory provisioned items are NV item values that are pre-loaded into memory slots by the factory during the manufacture of the communication device 10. The multiplexed factory provisioned NV items are stored in specific memory slot locations. Each of these specific memory slot location addresses are identified in the notation file in a factory NV item index 104. Unlike the "Factory Provisioning" category of NV items which often contain NV items unique to each individual carrier or OEM, the "Multiplexed Factory Provisioned" category of NV items typically includes NV items that are used by multiple carriers or OEMs. However, the values for these NV items may by unique to each carrier/OEM or even unique to each individual communication device. As a result, the value assigned to these NV items may be multiplexed in the flash memory 24 of the communication device. For example, this category of NV items may include a specific Authentication Key (Akey) file, a service programming code (SPC) file, or One time Key pad Subsidy Lock (OTKSL) file. While multiple service providers require an Akey file stored in non-volatile memory, each service provider will require a different value for the Akey. Indeed, each individual service provider account will require a unique Akey file. Accordingly, as different service provider accounts are enabled on the communication device, a different value for the Akey value must be written into the flash memory 24.

The fourth category of NV items may include multiplexed/software NV items. This category of NV items includes dynamic items that are assigned and initialized by the software build for each carrier during the initial account activation process. In contrast to the factory provisioned NV items, these NV item values are not generated and assigned until a user elects to activate an account with a select carrier. During the initial activation of an account with the select carrier, a value for the specific NV item may be generated and assigned. While no value for this category of NV items is stored until the user elects to activate an account with the selected carrier, once the activation process is initiated the values for the NV items belonging to this category are stored in pre-assigned memory slots within the communication device. The location of these pre-assigned memory slots may be contained within a carrier NV item index 105 that is part of the notation file. Examples of multiplexed/software NV items include MIP, usernames, passwords, etc.

The fifth category of NV items may include static notation file (UQCN) items. These NV item values are carrier specific items which are overwritten each time a new carrier software build is loaded. Examples of these NV items may include desktop images which display carrier logos on the display screen, SCI (Slot cycle Index), MIP (Mobile IP retries), etc. Such NV items remain static so long as the selected carrier remains the same. Thus, as a user switches between different accounts within the same carrier, the value for these NV items does not change. The static notation file items may be overwritten when a user with multiple accounts switches from one carrier to the next. The static notation file items may be categorized in such a way since they are not changed by any other means (e.g., over the air activation or by a connection manager). Therefore, there is no reason to maintain a separate copy of these NV Items. Consequently, valuable memory space may be reclaimed and conserved.

A sixth category of NV items may include multiplexed notation file (UQCN) items. Similar to the static notation file items, the multiplexed notation file items are carrier specific and are overwritten each time a new carrier software build is loaded. While the notation file may differ from one service provider to another, various NV items may appear in one service provider's notation file that also appear in another service provider's notation file. For example, each service provider may maintain a communication network that has finite boundaries. This communication network is often referred to as a subscriber's home network. When a subscriber travels outside the range of its home network, the subscriber may no longer conduct wireless communications over the home network. However, other service provider's may be operating a communication network in the subscriber's current location. These other communication networks may be referred to as a roaming network. In some instances, there may be multiple roaming networks available in a location. In order to provide their subscribers with the ability to continue conducting wireless communication outside of the home network, the subscriber's service provider often negotiates with other service providers to allow its subscriber's access to the roaming networks and vice versa. However, due to the specifics of the negotiated deals, a subscriber's service provider may have a preference list of which roaming network to access in instances where multiple roaming networks are available. This preference list is often referred to as a preferred roaming list (PRL). While each service provider utilizes a PRL, the PRL files are unique and specific to each service provider. Thus, while each notation file may have a PRL file as one of its NV items, the PRL file will be different for each service provider. Thus, NV items such as the PRL file may be an example of a multiplexed notation file NV item. The multiplexed UQCN items assume values that are defined in the notation file. At some point in time, they may also be changed by over-the air activation process or by the Connection Manager. The multiplexed software items may be the NV Items that have values assigned using some pre-defined algorithm in the software as defined by the network. A typical example of the multiplexed item is the shared secret key/password or usernames assigned by the carrier when the module is activated for service on its network. These values are saved in a specific format that is pre-defined in the software. In contrast, the UQCN (notation file) does not include such item values. Rather the UQCN (notation file) indicates the attribute as multiplexed in the file. For example, the UQCN may indicate the specific format or length or whether the NV item is a multiplexed NV item.

A seventh category of NV items may include software defined multiplexed items. These items are NV items that are set by the software build and do not change once the software build has activated. These NV items may include the model name of the communication device. The values of these items are assigned by the software and are usually settings that need to be preserved t allow for some functionality in software that makes the software build more efficient. For example, Network Access Identifier (NAI) is a user name that is automatically generated by the software to provide the user with a ".com" identifier. Typically, the phone number used for the communication device may be appended with a .com address to create a unique NAI. As an example, if a user's communication device is assigned the phone number 202-555-1212, the Verizon software build may append the phone number 202-555-1212 with the domain address @vzw3g.com to generate the NAI "202-555-1212@vzw3g.com". Such NV item values are generated once and then do not change after the software build has been initially activated. Because it is not necessary to generate an NAI after it has been generated once, the multiplexed NV item value may be stored in a location determined by the notation file and retrieved any time the software build and notation file for a selected carrier is subsequently activated.

By implementing the usage of notation files, communication devices equipped with a software defined communication module may be afforded the additional flexibility of having its communications supported by currently non-existent carrier networks. For example, as markets evolve additional carriers may be established which come online in the future, but are currently non-existent. Once the newly established carrier comes online, the necessary parameter values that would allow the newly established carrier to support communications on the existing communication device may be downloaded to the communication device in a notation file update.

The various embodiments provide the capability to manage, store and implement each of the necessary NV items for each possible service provider. Through the effective management and storage of the NV items, a user may switch between service provider accounts on a single communication device and maintain all of the necessary parameter values. In an embodiment, the various values assigned to a particular NV item are separately maintained and stored in memory. Each of the separately maintained and stored NV item values may be indexed. Each of the NV item values may be stored, for example, in the RAM or hard drive memory of the communication device. Once a particular carrier account is enabled and the notation file is activated, the various NV item values may be retrieved from RAM or hard drive memory and loaded into flash memory 24 of the communication module 20.

Figure 5:
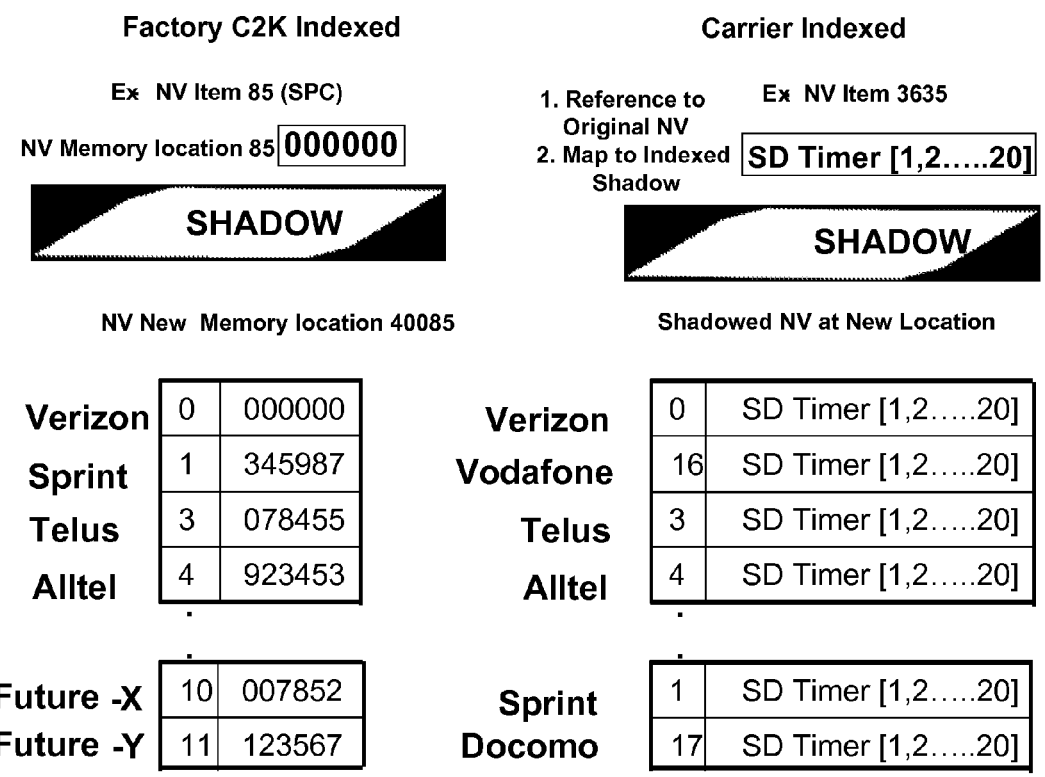
FIG. 5 illustrates various NV item values in a statically and dynamically multiplexed environment.

As discussed above, various embodiments leverage the ability to multiplex NV item values stored in memory. This process is sometimes referred to as shadowing NV item values. By multiplexing NV items, a single communication device 10 may be configured to support multiple carrier subscriptions as well as enhance the power of a notation file. Multiplexing or shadowing of NV items is a way to manage multiple copies of a carrier specific setting. It may be referred to as an indexed array with each of the indices referring to a carrier. FIG. 5 illustrates the concept of multiplexing NV items as it applies to factory indexed NV items. These items may be referred to as statically multiplexed because the values for each of the NV items in this category are known and are pre-loaded by the manufacturer of the communication device 10 at the factory. The value for each statically multiplexed NV item is stored in pre-assigned memory slot locations.

By way of example, the service provisioning code (SPC) is an NV item included in the category of factory indexed NV items. The SPC is used as a security protection. The communication module 20 of the communication device 10 would be allowed to provision only if a valid SPC is given during activation. Typically, each carrier utilizes a different value for SPC. For example, Verizon 1 may require that SPC be set to all zeros, while Sprint 2 may require SPC to be a randomly generated six digit number. Other carriers may require a specific six digit numeric code. In a conventional communication device the value of SPC is stored in non-volatile memory location 85. When the software build of a carrier requires the value of SPC, the software build looks to the value stored in non-volatile memory location 85.

In an embodiment, multiple values for the NV item SPC may be stored in memory. Each of the different values for SPC may be stored in different memory and slot locations. An index of the different memory and slot locations storing each of the different carrier values for the NV item SPC may be contained within the notation file for subsequent retrieval. As shown in FIG. 5, the communication device 10 may store a value for the SPC in a different slot for memory location 40085. For example, the value for SPC for Verizon may be stored in memory location 40085, slot 0. In this example a value of "000000" may be stored in memory location 40085, slot 0. The value for SPC for Sprint may be stored in memory location 40085, slot 1. In this example, a value of "345987" may be stored in memory location 40085, slot 1. FIG. 5 also illustrates that additional memory slot location exist for possible future carrier values. In this example, Future-X and Future-Y represent possible future carriers. In the event such future carriers begin to actively support communications, each of their specific SPC values may be stored in memory location 40085, slot 10 and slot 11, respectively.

In a conventional provisioning operation, a value for the NV item SPC may typically be stored in non-volatile memory location 85. Thus, when the selected carrier's software build executes, it may seek to retrieve the value for NV item SPC from memory location 85. However, during the implementation of the software build on a software defined radio based chipset communication module 20, after the software build loads, the notation file may be loaded. When the software build seeks to retrieve a value for the SPC from non-volatile memory location 85, the notation file may in turn direct the communication module 20 to retrieve the SPC value from a specific slot in memory location 40085. The slot may be chosen in accordance with the factory NV item index that correlates the selected carrier whose software build is being loaded with the appropriate memory slot location. Thus, if the Verizon software build is being loaded, then slot 0 may be accessed and a value of 000000 may be loaded into the non-volatile memory location 85. However, if the Sprint software build is being loaded, then slot 1 may be accessed and the value of 345987 may be loaded into the non-volatile memory location 85. Thus, the value of NV item SPC may be said to be multiplexed or shadowed by the multiple values for SPC stored in the new NV item memory location.

Similar to the static factory indexed NV items, dynamic carrier indexed NV items may be stored in memory and utilized by the software defined radio based chipset communication module 20. These NV items may be referred to as dynamically multiplexed items because the values for each of the NV items are not known until a user elects to activate an account with the selected carrier. Thus, each communication device 10 may dynamically create a copy and store values for these NV items on a need basis. Nevertheless, while a communication device 10 may not create a copy and store a value for a particular NV item for a select carrier, once the value for the particular NV item for a select carrier is received, a copy is generated and stored in a pre-assigned memory location and slot.

As an example, SD timer may be an NV item that is dynamically multiplexed. In a conventional operation, when a user activates an account with a select carrier, a value for SD timer is generated by the carrier and transmitted to the communication device 10. The received value for SD timer is then stored in NV item 3635. Each time the software build for the selected carrier executes and seeks to retrieve the value for SD timer, it is directed to NV memory location 3635.

In an embodiment, for example, when the user activates an account with a select carrier, the communication device 10 receives a value for among other NV items, the SD timer. The communication device 10 may receive the NV item value for SD timer in the same manner as in the conventional operation. For example, this value may be received in an over-the-air provisioning process or over a connected cable. However, in order to preserve these dynamic NV item values, an embodiment method utilizes the notation file to create a shadowed NV item value at a new memory location. In addition to writing the NV item value into flash memory 24, the notation file directs the software defined radio based chipset communication module 20 to create a new memory and slot location in hard-drive memory or RAM for the purpose of storing a shadow copy of the received NV item values. The new memory and slot location are assigned by the notation file. Each carrier has a pre-assigned memory/slot location for each NV item value. The notation file contains the pre-assigned index. It should be noted that until the user activates an account with a selected carrier, the memory location slot is not created as there is no dynamically assigned NV item value to store. As carrier accounts are activated, the dynamically assigned NV item values are stored in memory and their memory and slot locations are added to the carrier index. Thus, if a user has only activated a carrier account with two carriers, only two entries would appear in the carrier index. Because copies of the NV items are not created until a user elects to activate a new carrier account, memory may be conserved. Space in the communication device's memory is utilized on an as needed basis.

In addition, the listing of entries in the carrier index reflects the order in which carrier accounts are activated. For example, the Verizon notation file may dictate that all dynamically generated NV item values be stored in memory slot 0. However, the Vodafone notation file may dictate that its dynamically generated NV item values be stored in memory slot 16. As a result, even though Vodafone was the second carrier account to be activated, the carrier index will still record an index of 16 for Vodafone. The relative order of carriers listed in the carrier index provides an indication of the order in which accounts were activated.

In this manner, the notation file for each carrier indicates not only where NV item values may be retrieved from, but also where copies of received NV item values should be stored. By indexing and storing the NV item values to a separate memory location from the NV memory location, the values for each of the user's varied accounts may be preserved. In a conventional operation, each time a user elected to enable a new carrier account, the previous NV item values occupying memory locations in the flash memory 24 would be overwritten and not preserved. When the user sought to re-enable the previous carrier account, the user would be required to obtain new carrier indexed NV item values. Such a process may cause longer delays to enable the carrier account. In addition, some NV items values are generated each time the carrier account is activated. Once overwritten the user's carrier account will require new NV item values to be generated and assigned to the user's carrier account. This may cause great frustration to the user if NV items, such as the assigned telephone number, username or password, are reset each time the user enables a different carrier account. The embodiment methods of multiplexing NV item values allows a communication device 10 to not only quickly retrieve previously generated and assigned NV item values, but also maintain existing NV item values despite the switching of enabled carrier accounts.

Figure 6:
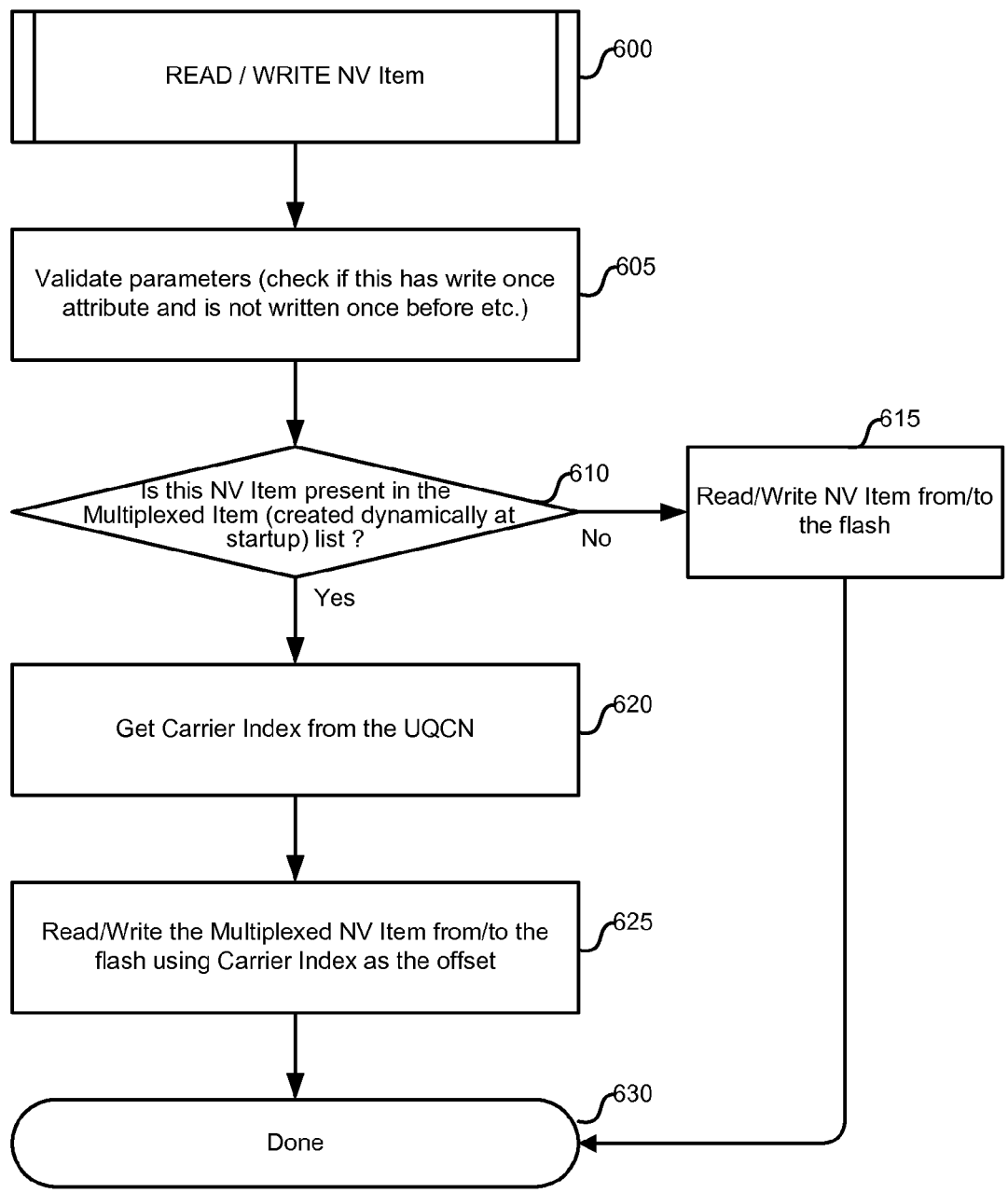
FIG. 6 is a process flow diagram illustrating example steps which may be implemented to read and write NV item values into flash memory according to an embodiment.

FIG. 6 illustrates a process flow of an embodiment method to read/write an NV item from/to the flash memory of a communication device. As discussed above, in order to operate properly, the software modules which effectuate the execution of various applications and processes require specific parameter values for particular NV items. The NV item values for a particular communication device type/model operating on a particular carrier network typically stores the NV item values in the Flash memory 26 of the communication device 10. As a user elects to change the carrier supporting communications on the communication device, new NV items must be written into the Flash memory 26 so that they are available for subsequent read requests. As various applications and/or processes are initiated the software modules effectuating their execution may read the NV item values stored in the Flash memory 26. When a request is received by the communication device processor 191 to change the carrier supporting communications on the communication device, a write NV item request 600 may be made. The write NV item request 600 initiates the process to write an appropriate NV item value for the communication device operating on the selected carrier into flash memory 26. Similarly, when an application or process is executed on the communication device 10 a read NV item request 600 may be made to read an NV item value from flash memory 26.

When the communication device processor 191 receives a read/write NV item request 600, the NV item parameters are validated, step 605. For example, the NV item may have a write once attribute that prevents the communication device processor 191 from writing the NV item more than once into flash memory 26. The communication device processor 191 may determine if the NV item value has already been written before and terminate the write process if it has already been written. Once the NV item parameters have been validated, the communication device processor determines if the NV item is present in the Multiplexed Item list described above with reference to FIG. 5, determination 610. The Multiplexed Item list may be dynamically created when the communication device 10 starts up. If the NV item is not one of the multiplexed items (i.e., determination 610="No"), then the NV item value may be either read from or written to the flash memory 26 directly, step 615. Once the NV item value is read or written, the process is complete, step 630.

However, if the NV item is present in the multiplexed item list (i.e., determination 610="Yes"), then the processor 191 may obtain the selected carrier index from the notation file, step 620. Using the selected carrier index as the proper offset, the processor may read/write the NV item value from/to the appropriate flash memory location, step 625. Once the NV item value is read or written, the process is complete, step 630. The process may be re-initiated for each additional NV item value that is to be read from or written into the flash memory 26.

In another embodiment, the data stored in the notation file may be used to restrict which communication modules 20 may successfully implement a carrier's software build and notation file. A software defined radio based chipset communication module 20, if programmed and provisioned correctly, may access any carrier's communication network. However, some carrier's may wish to restrict which devices access their network. For example, some carriers may partner up with certain manufacturers to provide the manufacturers with exclusive or semi-exclusive access to the carrier's communication networks. Similarly, certain manufacturers may wish to limit the carrier networks that their communication devices may access. In order to restrict which carrier communication networks, the communication modules 20 may access a technology lock (also referred to as a device lock, carrier lock or notebook lock).

Figure 7:
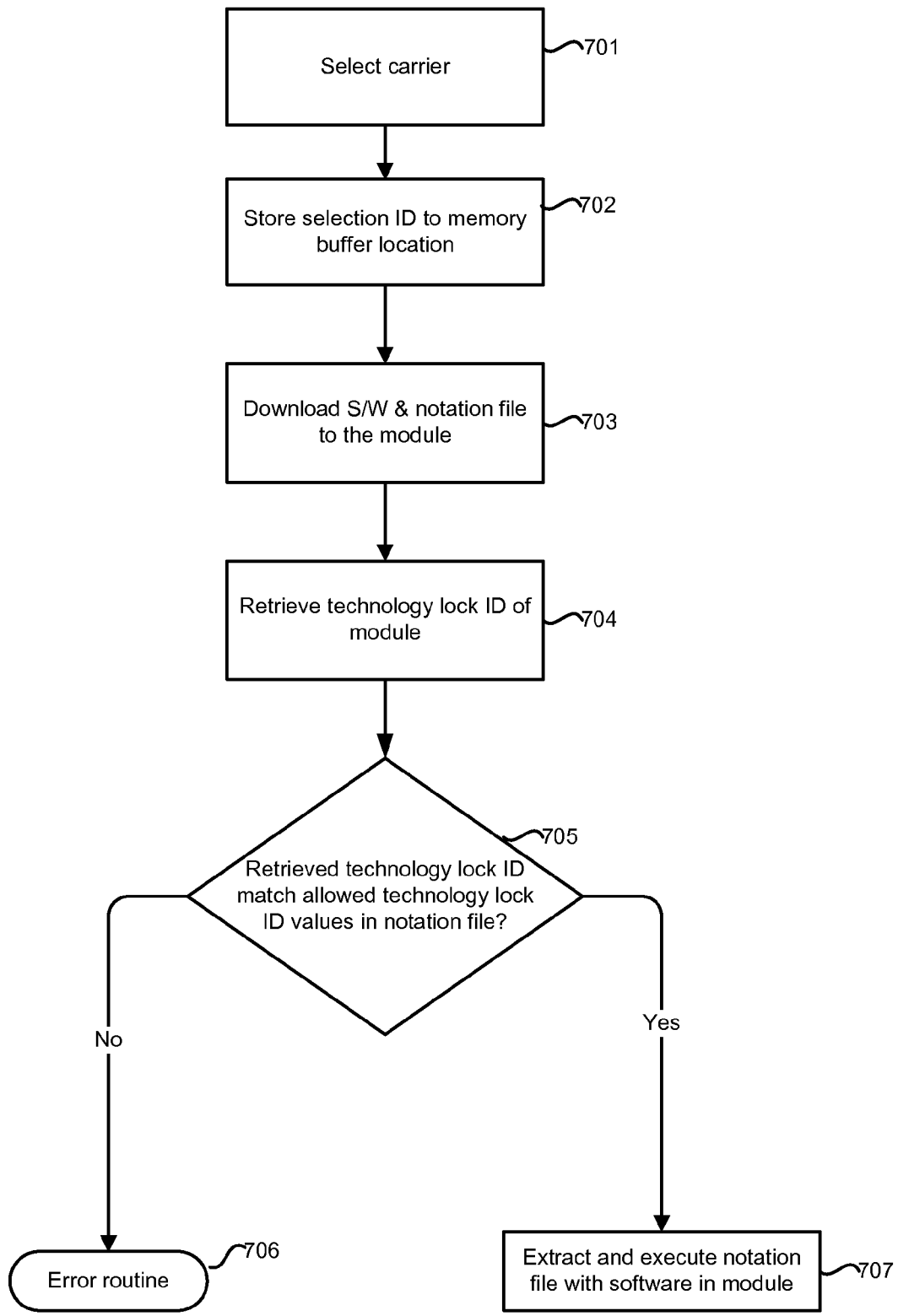
FIG. 7 is a process flow diagram illustrating example steps which may be implemented to provide a technology lock according to an embodiment.

FIG. 7 illustrates a process flow of an embodiment technology lock method. When a user elects to activate a new carrier account, the user may select a carrier from a user interface menu, step 701. The user's carrier selection may be temporarily stored in a memory buffer location, step 702. The appropriate software build and notation file may be downloaded or received via an over-the-air programming/provisioning process, step 703. Once the software build and notation file have been received, the software defined radio based chipset communication module may retrieve its own technology lock ID from memory, step 704. The technology lock ID may comprise the vendor identifier/product identifier (VID/PID), device identifier, carrier identifier, notebook identifier or an arbitrarily defined identifier, or some combination thereof Typically, the technology lock ID is provisioned into non-volatile memory as an NV item by the manufacturer in the factory. The retrieved technology lock ID is compared with a compatible technology value contained in the notation file, determination 705. In order to allow the carrier's software build and notation file to load and execute completely, the retrieved technology lock ID must be recognized as a compatible vendor or product by the notation file. If the retrieved technology lock value matches one of the allowed technology lock values contained in the notation file (i.e., determination 705="Yes"), then the remainder of the notation file is extracted and executed in conjunction with the software build loaded into the module, step 707. However, if the retrieved technology lock value does not match one of the allowed technology lock values contained in the notation file (i.e., determination 705="No"), then an error routine is initiated and the remainder of the notation file is not extracted and the software may be deleted from the module, step 705. In this manner, only compatible communication devices 10 may be permitted to load a carrier's software build and notation file. Without the software build and notation file for a selected carrier loaded, a communication device will not be able to access the selected carrier's communication network.

Figure 8A:
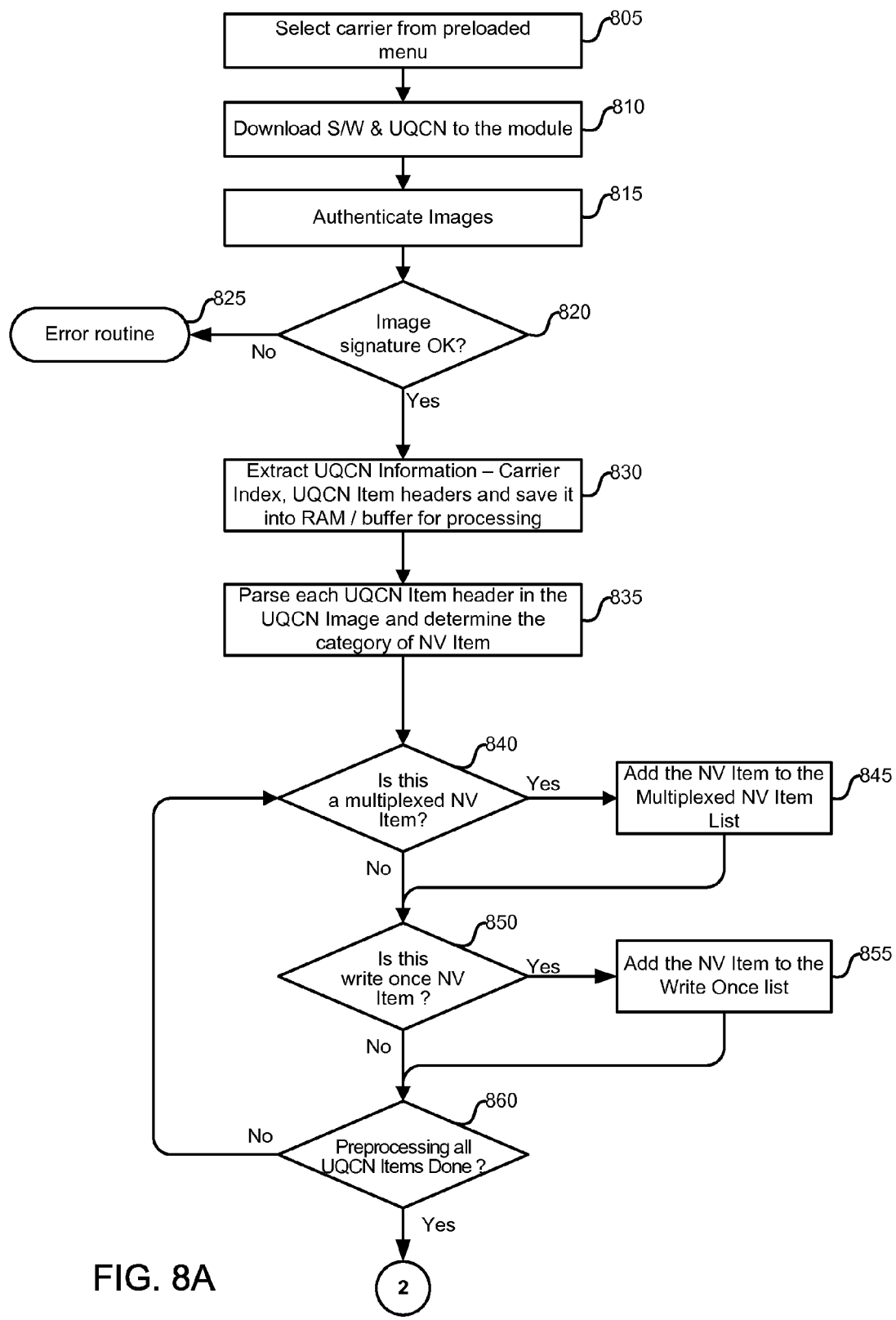
FIGS. 8A and 8B are process flow diagrams illustrating example steps which may be implemented to install the appropriate software module and NV items for a selected carrier supporting communications on the communication device according to an embodiment.
Figure 8B:
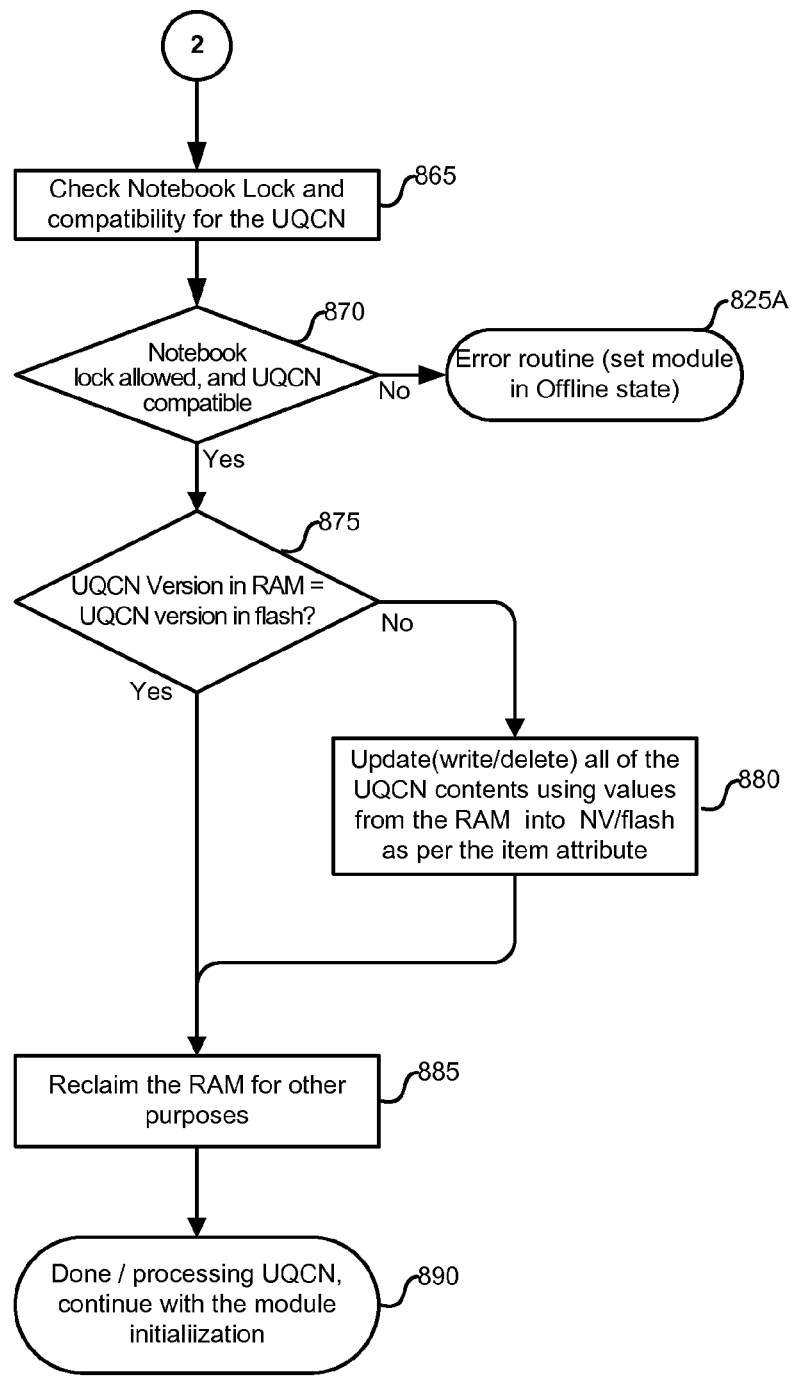

FIGS. 8A and 8B illustrate a process flow of an embodiment method for installing the appropriate software module and NV items for a selected carrier supporting communications on a communication device. When a user elects to change the carrier supporting communications on the communication device 10, the user may select a carrier from a preloaded menu using the user interface controls 12, 13 in conjunction with the display 11, step 805. Alternative embodiments may utilize a touchscreen display or other user interface to select the carrier. Once the user's carrier selection is received, the processor 191 downloads the corresponding software build and notation file from storage to the communication module 20, step 810. Typically, the various software builds and notation files may be stored in the communication device's memory unit 192 or other non-volatile storage devices such as a hard drive. In alternative embodiments, the software build and/or notation files may be downloaded from a remote storage location. Once the software build and notation file have been downloaded, the software build image is authenticated, step 815. If the downloaded software build image is not authentic (i.e., determination 820="No"), the processor 191 initiates an error routine, step 825. If the downloaded software build image is authentic (i.e., determination 820="Yes"), the processor 191 continues to extract information from the notation file and store the extract information into the memory 192 for processing, step 830. This information may include such data as the carrier index, as well as notation file item headers. Each of the extracted notation file item headers may be parsed in order to determine the category of NV items that are required for the selected carrier to properly support communications on the device, step 835. Based on the extracted and parsed notation file information, the processor 191 may determine if a particular NV item is a multiplexed NV item, determination 840. If the NV item is a multiplexed NV item (i.e., determination 840="Yes"), the NV item may be added to the multiplexed NV item list, step 845. Once the NV item is added to the multiplexed NV item list or if the NV item is determined to not be a multiplexed item (i.e., determination 840="No"), the processor may determine if the NV item is a write once NV item, determination 850. If the NV item is a write once NV item (i.e., determination 850="Yes"), the NV item may be added to the write once NV item list, step 855. The dynamically created multiplexed NV item list and write once NV item list may be utilized during the read/write NV item process described above with reference to FIG. 6.

Once the NV item is added to the write once NV item list or if the NV item is determined to not be a write once item (i.e., determination 850="No"), the processor may determine if all of the notation file items have been complete, determination 860. In other words, the processor may determine if any other NV items should be analyzed. If the there are additional NV items listed in the notation file and that preprocessing of the notation file items is not complete (i.e., determination 860="No"), the processor may return to determination 840 and complete steps 840-860 again. If, however, all of the preprocessing is complete (i.e., determination 860="Yes"), the processor may proceed to check the notebook lock and compatibility for the notation file, step 865 shown in FIG. 8B. The process flow illustrating a notebook lock embodiment method is discussed above with reference to FIG. 7. If the results of the notebook lock and notation compatibility method indicate that the software build and notation file are not allowed for the communication device 10 (i.e., determination 870="No"), the error routine may be initiated and the module may be set into an offline state, step 825A.

If the software build and notation file are allowed for the communication device 10 (i.e., determination 870="Yes"), the processor may determine if the notation file loaded into memory 192 is the same version of the notation file loaded into the flash memory 26, determination 875. If the version of the notation file loaded into memory 192 matches that of the notation file loaded into the flash memory (i.e., determination 875="Yes"), the memory 192 resources may be cleared and reclaimed for other purposes, step 885. If the version of the notation file loaded into memory 192 does not match that of the notation file loaded into the flash memory (i.e., determination 875="No"), the notation file stored in flash may be updated with the notation file loaded into the memory 192, step 880. Each of the NV item values stored in flash 26 may be written over or deleted using the contents of the notation file loaded in memory 192 as per the NV item attribute. Once the notation file loaded in flash has been updated, the memory 192 resources may be cleared and reclaimed for other purposes, step 885. Once the memory resources have been reclaimed, the processor may continue with the communication module initialization using the software build and NV item values from the notation file, step 890. In this manner, a communication device 10 having the software-defined communication module 20 may be quickly modified to enable communication over a different carrier's communication network regardless of communication technology or selected carrier.

Various embodiments allow communication device manufacturers to streamline the manufacturing process of the communication device. In a conventional manufacturing process of a communication device, the communication devices are loaded with factory provisioning software as well as with the required NV item values. However, the tools typically employed by original equipment manufacturers may only write individual NV items. The tools must retrieve the NV item, write the NV item value into flash, and then serially repeat the process for the next NV item. This provisioning process greatly hampers the manufacturing process. By loading the communication device with the notation file in conjunction with the factory provisioning software, the various embodiments may load the necessary NV item values into the flash memory after the communication devices have left the factory. This optimizes the manufacturing time considerably. Moreover, since the notation file processing occurs before other tasks (e.g., protocol processing) are activated, the loading of the notation file NV items may be quickly loaded. In addition, because the notation file is typically a small file that may be quickly and easily updated, the manufacturing process may be quickly adapted and configured to load the NV items for specific/multiple carriers.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module of processor-executable software instructions may be stored in a non-transitory processor-readable memory which may be any of RAM memory, flash memory, ROM memory, EPROM memory, EEPROM memory, registers, hard disk, a removable disk, a CD-ROM, or any other form of storage medium known in the art. An exemplary non-transitory storage medium is coupled to a processor such that the processor can read information from, and write information to, the storage medium. In the alternative, the storage medium may be integral to the processor. The processor and the storage medium may reside in an ASIC. The ASIC may reside in a user terminal or communication device. In the alternative, the processor and the storage medium may reside as discrete components in a user terminal or communication device. Additionally, in some aspects, the steps and/or actions of a method or algorithm may reside as one or any combination or set of codes and/or instructions on a non-transitory processor readable medium and/or non-transitory computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method of programming a communication device containing a software defined radio based chipset module, comprising:
    selecting a carrier to support communications for the communication device from a preloaded menu;
    loading a software build image for the selected carrier into a volatile memory of the communication device;
    loading a notation file for the selected carrier into the volatile memory, the notation file comprising an index value assigned to the selected carrier and a notation file header, wherein the index value correlates to a memory slot of a memory location of the volatile memory;
    extracting the index value and the notation file header from the notation file;
    parsing the extracted notation file header to determine a category of a non-volatile memory item value;
    determining whether the non-volatile memory item value is a multiplexed non-volatile memory item value based on the determined category of the non-volatile memory item value;
    retrieving the non-volatile memory item value from the memory slot of the memory location of the volatile memory correlated to the index value included in the notation file in response to determining the non-volatile memory item value is a multiplexed non-volatile memory item value based on the determined category of the non-volatile memory item value;
    loading the retrieved non-volatile memory item value into a non-volatile memory; and
    executing the software build image using the retrieved non-volatile memory item value loaded in the non-volatile memory.

2. The method of claim 1, further comprising:
    receiving a generated non-volatile memory item value from the selected carrier during a provisioning process;
    generating a copy of the received generated non-volatile memory item value; and
    storing the copy of the received generated non-volatile memory item value in the volatile memory in a slot location corresponding to the index value assigned to the selected carrier in the notation file.

3. The method of claim 1, further comprising:
    determining whether a non-volatile memory item value stored in the non-volatile memory matches the non-volatile memory item value stored in the volatile memory; and reclaiming volatile memory space assigned to the non-volatile memory item value when it is determined that the non-volatile memory item value stored in the non-volatile memory matches the non-volatile memory item value stored in the volatile memory.

4. The method of claim 1, further comprising:
determining whether a non-volatile memory item value stored in the non-volatile memory matches the non-volatile memory item value stored in the volatile memory;
updating the non-volatile memory item value stored in the non-volatile memory with the non-volatile memory item value stored in the volatile memory when it is determined that the non-volatile memory item value stored in the non-volatile memory matches the non-volatile memory item value stored in the volatile memory; and
reclaiming volatile memory space assigned to the non-volatile memory item value after the non-volatile memory item value stored in the non-volatile memory has been updated to match the non-volatile memory item value stored in the volatile memory.

5. A method for restricting which carrier communication network a communication device containing a software defined radio based chipset module may access, the method comprising:
selecting a carrier in the communication device;
loading a software build image for the selected carrier into a volatile memory of the communication device;
loading a notation file for the selected carrier into the volatile memory, the notation file including an index value assigned to the selected carrier, a notation file header, and a compatible technology lock ID, wherein the index value is correlates to a memory slot of a memory location of the volatile memory;
retrieving a technology lock ID from a non-volatile memory;
retrieving the compatible technology lock ID from the notation file for the selected carrier;
determining whether the compatible technology lock ID matches the technology lock ID retrieved from the non-volatile memory;
extracting the index value and the notation file header from the notation file;
parsing the extracted notation file header to determine a category of a non-volatile memory item value;
determining whether the non-volatile memory item value is a multiplexed non-volatile memory item value based on the determined category of the non-volatile memory item value;
retrieving the non-volatile memory item value from the memory slot of the memory location of the volatile memory correlated to the index value included in the notation file in response to determining the non-volatile memory item value is a multiplexed non-volatile memory item value based on the determined category of the non-volatile memory item value and determining the technology lock ID retrieved from the non-volatile memory matches the compatible technology lock ID;
loading the retrieved non-volatile memory item value into the non-volatile memory; and
executing the software build image using the retrieved non-volatile memory item value loaded in the non-volatile memory.

6. The method of claim 5, further comprising:
receiving a generated non-volatile memory item value from the selected carrier during a provisioning process;
generating a copy of the received generated non-volatile memory item value; and
storing the copy of the received generated non-volatile memory item value in the volatile memory in a slot location corresponding to the index value assigned to the selected carrier included in the notation file.

7. The method of claim 5, wherein the technology lock ID comprises a vendor identifier/product identifier.

8. A communication device, comprising:
a software defined radio based chipset module;
means for selecting a carrier to support communications for the communication device from a preloaded menu;
means for loading a software build image for the selected carrier into a volatile memory;
means for loading a notation file for the selected carrier into the volatile memory, the notation file comprising an index value assigned to the selected carrier and a notation file header, wherein the index value correlates to a memory slot of a memory location of the volatile memory;
means for extracting the index value and the notation file header from the notation file;
means for parsing the extracted notation file header;
means for determining a category of a non-volatile memory item value based on the parsed extracted notation file header;
means for determining whether the non-volatile memory item value is a multiplexed non-volatile memory item value based on the determined category of the non-volatile memory item value;
means for retrieving the non-volatile memory item value from the memory slot of the memory location of the volatile memory correlated to the index value included in the notation file in response to the means for determining whether the non-volatile memory item value is a multiplexed non-volatile memory item value determines that the non-volatile memory item value is a multiplexed non-volatile memory item value based on the determined category of the non-volatile memory item value;
means for loading the retrieved non-volatile memory item value into a non-volatile memory; and
means for executing the software build image using the retrieved non-volatile memory item value loaded in the non-volatile memory.

9. The communication device of claim 8, further comprising:
means for receiving a generated non-volatile memory item value from the selected carrier during a provisioning process;
means for generating a copy of the received generated non-volatile memory item value; and
means for storing the copy of the received generated non-volatile memory item value in the volatile memory in a slot location corresponding to the index value assigned to the selected carrier in the notation file.

10. The communication device of claim 8, further comprising:
means for determining whether a non-volatile memory item value stored in the non-volatile memory matches the non-volatile memory item value stored in the volatile memory; and
means for reclaiming volatile memory space assigned to the non-volatile memory item value when it is determined that the non-volatile memory item value stored in the non-volatile memory matches the non-volatile memory item value stored in the volatile memory.

11. The communication device of claim 8, further comprising:
   means for determining whether a non-volatile memory item value stored in the non-volatile memory matches the non-volatile memory item value stored in the volatile memory;
   means for updating the non-volatile memory item value stored in the non-volatile memory with the non-volatile memory item value stored in the volatile memory when it is determined that the non-volatile memory item value stored in the non-volatile memory match the non-volatile memory item value stored in the volatile memory; and
   means for reclaiming volatile memory space assigned to the non-volatile memory item value after the non-volatile memory item value stored in the non-volatile memory has been updated to match the non-volatile memory item value stored in the volatile memory.

12. A communication device comprising:
   a software defined radio based chipset module;
   means for selecting a carrier in the communication device;
   means for loading a software build image for the selected carrier into a volatile memory of the communication device;
   means for loading a notation file for the selected carrier into the volatile memory, the notation file including an index value assigned to the selected carrier, a notation file header, and a compatible technology lock ID, wherein the index value correlates to a memory slot of a memory location of the volatile memory;
   means for retrieving a technology lock ID from a non-volatile memory;
   means for retrieving the compatible technology lock ID from the notation file for the selected carrier;
   means for determining whether the compatible technology lock ID matches the technology lock ID retrieved from the non-volatile memory;
   means for extracting the index value and the notation file header from the notation file;
   means for parsing the extracted notation file header;
   means for determining a category of a non-volatile memory item value from the parsed extracted notation file;
   means for determining whether the non-volatile memory item value is a multiplexed non-volatile memory item value based on the determined category of the non-volatile memory item value;
   means for retrieving the non-volatile memory item value from the memory slot of the memory location of the volatile memory correlated to the index value included in the notation file in response to the means for determining whether the non-volatile memory item value is a multiplexed non-volatile memory item value determines that the non-volatile memory item value is a multiplexed non-volatile memory item value based on the determined category of the non-volatile memory item value;
   means for determining whether the technology lock ID retrieved from the non-volatile memory matches the compatible technology lock ID;
   means for loading the retrieved non-volatile memory item value into the non-volatile memory; and
   means for executing the software build image using the retrieved non-volatile memory item value loaded in the non-volatile memory.

13. The communication device of claim 12, further comprising:
   means for receiving a generated non-volatile memory item value from the selected carrier during a provisioning process;
   means for generating a copy of the received generated non-volatile memory item value; and
   means for storing the copy of the received generated non-volatile memory item value in the volatile memory in a slot location corresponding to the index assigned to the selected carrier in the notation file.

14. The communication device of claim 12, wherein the technology lock ID comprises a vendor identifier/product identifier.

15. A communication device comprising:
   a software defined radio based chipset module;
   a non-volatile memory;
   a volatile memory; and
   a processor coupled to the non-volatile memory, the volatile memory and the software defined radio based chipset module, wherein the processor is configured with software instructions to perform steps comprising:
     selecting a carrier to support communications from the communication device from a preloaded menu;
     loading a software build image for the selected carrier into the volatile memory;
     loading a notation file for the selected carrier into the volatile memory, the notation file comprising an index value assigned to the selected carrier and a notation file header, wherein the index value correlates to a memory slot of a memory location of the volatile memory;
     extracting the index value and the notation file header from the notation file;
     parsing the extracted notation file header to determine a category of a non-volatile memory item value;
     determining whether the non-volatile memory item value is a multiplexed non-volatile memory item value based on the determined category of the non-volatile memory item value;
     retrieving the non-volatile memory item value from the memory slot of the memory location of the volatile memory correlated to the index value included in the notation file in response to determining the non-volatile memory item value is a multiplexed non-volatile memory item value based on the determined category of the non-volatile memory item value;
     loading the retrieved non-volatile memory item values into the non-volatile memory; and
     executing the software build image using the retrieved non-volatile memory item values loaded in the non-volatile memory.

16. The communication device of claim 15, wherein the processor is configured with software instructions to perform steps further comprising:
   receiving a generated non-volatile memory item value from the selected carrier during a provisioning process;
   generating a copy of the received generated non-volatile memory item value; and
   storing the copy of the received generated non-volatile memory item value in the volatile memory in a slot location corresponding to the index value assigned to the selected carrier in the notation file.

17. The communication device of claim 15, wherein the processor is configured with software instructions to perform steps further comprising:
  determining whether a non-volatile memory item value stored in the non-volatile memory matches the non-volatile memory item value stored in the volatile memory; and
  reclaiming volatile memory space assigned to the non-volatile memory item value when it is determined that the non-volatile memory item value stored in the non-volatile memory matches the non-volatile memory item value stored in the volatile memory.

18. The communication device of claim 15, wherein the processor is configured with software instructions to perform steps further comprising:
  determining whether a non-volatile memory item value stored in the non-volatile memory matches the non-volatile memory item value stored in the volatile memory;
  updating the non-volatile memory item value stored in the non-volatile memory with the non-volatile memory item value stored in the volatile memory when it is determined that the non-volatile memory item value stored in the non-volatile memory matches the non-volatile memory item value stored in the volatile memory; and
  reclaiming volatile memory space assigned to the non-volatile memory item value after the non-volatile memory item value stored in the non-volatile memory has been updated to match the non-volatile memory item value stored in the volatile memory.

19. A communication device, comprising:
  a software defined radio based chipset module;
  a non-volatile memory;
  a volatile memory; and
  a processor coupled to the non-volatile memory, the volatile memory and the software defined radio based chipset module, wherein the processor is configured with software instructions to perform steps comprising:
    selecting a carrier;
    loading a software build image for the selected carrier into the volatile memory;
    loading a notation file for the selected carrier into the volatile memory, the notation file including an index value assigned to the selected carrier, a notation file header, and a compatible technology lock ID, wherein the index value is correlates to a memory slot of a memory location of the volatile memory;
    retrieving a technology lock ID from the non-volatile memory;
    retrieving the compatible technology lock ID from the notation file for the selected carrier;
    determining whether the compatible technology lock ID matches the technology lock ID retrieved from the non-volatile memory;
    extracting the index value and the notation file header from the notation file;
    parsing the extracted notation file header to determine a category of a non-volatile memory item value;
    determining whether the non-volatile memory item value is a multiplexed non-volatile memory item value based on the determined category of the non-volatile memory item value;
    retrieving the non-volatile memory item value from the memory slot of the memory location of the volatile memory correlated to the index value included in the notation file in response to determining the non-volatile memory item value is a multiplexed non-volatile memory item value based on the determined category of the non-volatile memory item value and determining the technology lock ID retrieved from the non-volatile memory matches the compatible technology lock ID;
    loading the retrieved non-volatile memory item value into the non-volatile memory; and
    executing the software build image using the retrieved non-volatile memory item value loaded in the non-volatile memory.

20. The communication device of claim 19, wherein the processor is configured with software instructions to perform steps further comprising:
  receiving a generated non-volatile memory item value from the selected carrier during a provisioning process;
  generating a copy of the received generated non-volatile memory item value; and
  storing the copy of the received generated non-volatile memory item value in the volatile memory in a slot location corresponding to the index value assigned to the selected carrier included in the notation file.

21. The communication device of claim 19, wherein the technology lock ID comprises a vendor identifier/product identifier.

22. A non-transitory processor-readable storage medium having stored thereon processor-executable software instructions configured to cause a communication device processor to perform operations comprising:
  selecting a carrier to support communications for the communication device from a preloaded menu;
  loading a software build image for the selected carrier into a volatile memory;
  loading a notation file for the selected carrier into the volatile memory, the notation file comprising an index value assigned to the selected carrier and a notation file header, wherein the index value correlates to a memory slot of a memory location of the volatile memory;
  extracting the index value and the notation file header from the notation file;
  parsing the extracted notation file header to determine a category of a non-volatile memory item value;
  determining whether the non-volatile memory item value is a multiplexed non-volatile memory item value based on the determined category of the non-volatile memory item value;
  retrieving the non-volatile memory item value from the memory slot of the memory location of the volatile memory correlated to the index value included in the notation file in response to determining the non-volatile memory item value is a multiplexed non-volatile memory item value based on the determined category of the non-volatile memory item value;
  loading the retrieved non-volatile memory item value into a non-volatile memory; and
  executing the software build image using the retrieved non-volatile memory item value loaded in the non-volatile memory.

23. The non-transitory processor-readable storage medium of claim 22, wherein the stored processor-executable software instructions are configured to cause a communication device processor to perform operations further comprising:
  receiving a generated non-volatile memory item value from the selected carrier during a provisioning process;
  generating a copy of the received generated non-volatile memory item value; and
  storing the copy of the received generated non-volatile memory item value in the volatile memory in a slot location corresponding to the index value assigned to the selected carrier in the notation file.

24. The non-transitory processor-readable storage medium of claim 22, wherein the stored processor-executable software instructions are configured to cause a communication device processor to perform operations further comprising:
determining whether a non-volatile memory item value stored in the non-volatile memory matches the non-volatile memory item value stored in the volatile memory; and
reclaiming volatile memory space assigned to the non-volatile memory item value when it is determined that the non-volatile memory item value stored in the non-volatile memory matches the non-volatile memory item value stored in the volatile memory.

25. The non-transitory processor-readable storage medium of claim 22, wherein the stored processor-executable software instructions are configured to cause a communication device processor to perform operations further comprising:
determining whether a non-volatile memory item value stored in the non-volatile memory matches the non-volatile memory item value stored in the volatile memory;
updating the non-volatile memory item value stored in the non-volatile memory with the non-volatile memory item value stored in the volatile memory when it is determined that the non-volatile memory item value stored in the non-volatile memory matches the non-volatile memory item value stored in the volatile memory; and
reclaiming volatile memory space assigned to the non-volatile memory item value after the non-volatile memory item value stored in the non-volatile memory has been updated to match the non-volatile memory item value stored in the volatile memory.

26. A non-transitory processor-readable storage medium having stored thereon processor-executable software instructions configured to cause a communication device processor to perform operations comprising:
selecting a carrier;
loading a software build image for the selected carrier into a volatile memory;
loading a notation file for the selected carrier into the volatile memory, the notation file including an index value assigned to the selected carrier, a notation file header, and a compatible technology lock ID, wherein the index value is correlates to a memory slot of a memory location of the volatile memory;
retrieving a technology lock ID from a non-volatile memory;
retrieving the compatible technology lock ID from the notation file for the selected carrier;
determining whether the compatible technology lock ID matches the technology lock ID retrieved from the non-volatile memory;
extracting the index value and the notation file header from the notation file;
parsing the extracted notation file header to determine a category of a non-volatile memory item value;
determining whether the non-volatile memory item value is a multiplexed non-volatile memory item value based on the determined category of the non-volatile memory item value;
retrieving the non-volatile memory item value from the memory slot of the memory location of the volatile memory correlated to the index value included in the notation file in response to determining the non-volatile memory item value is a multiplexed non-volatile memory item value based on the determined category of the non-volatile memory item value and determining the technology lock ID retrieved from the non-volatile memory matches the compatible technology lock ID;
loading the retrieved non-volatile memory item value into the non-volatile memory; and
executing the software build image using the retrieved non-volatile memory item value loaded in the non-volatile memory.

27. The non-transitory processor-readable storage medium of claim 26, wherein the stored processor-executable software instructions are configured to cause a communication device processor to perform operations further comprising:
receiving a generated non-volatile memory item value from the selected carrier during a provisioning process;
generating a copy of the received generated non-volatile memory item value; and
storing the copy of the received generated non-volatile memory item value in the volatile memory in a slot location corresponding to the index value assigned to the selected carrier included in the notation file.

28. The non-transitory processor-readable storage medium of claim 26, wherein the technology lock ID comprises a vendor identifier/product identifier.

* * * * *